Figure 1:
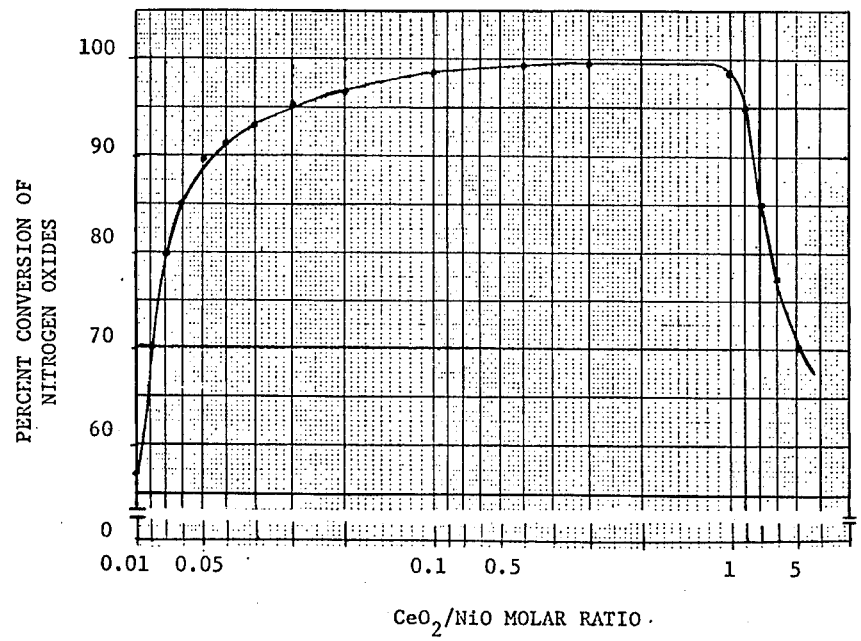

United States Patent [19]

Oshimura et al.

[11] 4,018,710
[45] Apr. 19, 1977

[54] REDUCTION CATALYSTS AND PROCESSES FOR REDUCTION OF NITROGEN OXIDES

[75] Inventors: Masakazu Oshimura, Ibaraki; Akira Kawakami, Takatsuki; Hiroaki Hosoda, Moriguchi; Osamu Okamoto, Ibaraki; Osamu Watanabe, Suita; Shinichi Fujii, Osaka; Satoru Yamaguchi, Suita; Noboru Odani, Ibaraki; Yoshizo Koori, Osaka, all of Japan

[73] Assignee: Hitachi Maxell, Ltd., Osaka, Japan

[22] Filed: Aug. 27, 1974

[21] Appl. No.: 501,078

[30] Foreign Application Priority Data

Aug. 27, 1973 Japan .............................. 48-95854

[52] U.S. Cl. .................. 252/439; 252/462; 423/213.5; 423/239; 423/351
[51] Int. Cl.² .................. B01J 27/04; B01J 23/10
[58] Field of Search .................. 252/462, 439; 423/213.5

[56] References Cited

UNITED STATES PATENTS

| 3,170,758 | 2/1965 | Honerkamp | 423/213.5 |
| 3,524,721 | 8/1970 | Stephens | 252/462 X |
| 3,718,607 | 2/1973 | Martin | 252/439 |
| 3,784,675 | 1/1974 | Kobylinski et al. | 423/213.5 |
| 3,886,260 | 5/1975 | Unland | 423/213.5 |

*Primary Examiner*—Patrick P. Garvin
*Attorney, Agent, or Firm*—Birch, Stewart, Kolasch and Birch

[57] ABSTRACT

The reduction of nitrogen oxides involves the passage of gases containing nitrogen oxides at higher than 500° C. over a catalyst comprising cerium oxide and nickel oxide in the $CeO_2/NiO$ molar ratio of about 0.05 : 1 to 2.5 : 1 and when desired an addition thereto of rhodium in an amount of from about 7.5 to 25 parts by weight per 100 parts by weight of the nickel oxide and cerium oxide composition and when desired an addition to said nickel oxide and cerium oxide composition of ruthenium in an amount of about 10 to 50 parts by weight or an addition to said composition containing rhodium of ruthenium in an amount of about 15 to 50 parts by weight per 100 parts by weight of the nickel oxide and cerium oxide composition. Also, when desired, an addition to said composition of one or more metal sulfides and an addition to said composition of one or more metal oxides is utilized.

9 Claims, 16 Drawing Figures

REDUCTION CATALYSTS AND PROCESSES FOR REDUCTION OF NITROGEN OXIDES

The present invention relates to a catalyst for the reduction of oxides of nitrogen and a process for reducing the same. More particularly, it relates to a reduction catalyst and a process for the reduction of nitrogen oxides in exhaust or off gases emerging from internal combustion engines, power plants, chemical plants, and the like.

The reactions by which the oxides of nitrogen represented herein by $NO_x$ are reduced to free nitrogen ($N_2$) are as follows:

$$NO_x + CO \rightarrow N_2 + CO_2 \quad\quad 1$$

$$NO_x + H_2 \rightarrow N_2 + H_2O \quad\quad 2$$

$$NO_x + C_nH_m \rightarrow N_2 + CO_2 + H_2O \quad\quad 3$$

The reduction of nitrogen oxides has heretofore been effected by the employment of catalysts such as palladium or nickel oxide. However, palladium is expensive and susceptible to catalyst poisons such as lead compounds or sulfur compounds present in the exhaust gases, so that such properties cause a considerable decrease in its catalytic activity and place a limit on its practical use as the reduction catalyst. On the other hand, it is known that nickel oxide is rarely used alone, but it is employed in combination with a promoter such as barium oxide or neodymium oxide. This combined catalyst is somewhat more favorable with respect to resistance to catalyst poisons than palladium, but it is unsatisfactory with respect to durability because of a great reduction in the catalytic activity over a period of time when used at high temperatures.

In many cases, the reduction reactions as described hereinabove as reaction schemes (1), (2), and (3) usually take place under the reaction conditions which are difficult to be provided at a constant level. In particular, the clean-up of the exhaust gases emerging from the internal combustion engines of vehicles is effected under the conditions where it is impossible to make constant various factors affecting the chemical reaction velocity, such as the composition, concentration, amount and temperature of the reactive gases, so that catalysts to be employed for this purpose must meet various requirements of maintaining the catalytic activity thereof at a high level in a wide range or temperatures and should be resistant to catalyst poisons which are contained in the exhaust gases. Furthermore, the cost of such catalysts must be reasonable or cheaper.

Accordingly, an object of the present invention is to provide a catalyst for the reduction of nitrogen oxides having the characteristics to satisfy the requirements as described hereinabove. Another object of the present invention is to provide a reduction catalyst which can at the same time prevent ammonia as much as possible from being formed in the course of the reduction of the nitrogen oxides. A further object of the present invention is to provide a process for reducing the oxides of nitrogen with the use of said catalyst. Other objects, features and advantages of the present invention will become apparent during the course of the description, drawings and claims.

It has been found that a catalyst comprising a composition of nickel oxide and cerium oxide or such a catalyst containing further other various catalyst components or such a catalyst treated by certain physicochemical means can attain the objects of the present invention.

FIGS. 1–16 show the improved results obtained by the catalysts of this invention.

The catalyst of the present invention may be prepared by impregnating an aqueous solution of salts of nickel and cerium such as, for example, the acetate, nitrate, carbonate and sulfate in a porous carrier material such as, for example, alumina, silica, magnesia and zirconia, or by adhering said nickel and cerium salts to a carrier comprising a heat resistant metal plate with a slightly rough film derived from alumina or the like coated on its surface, and then by calcining such catalyst components for about 20 minutes to about 3 hours at a temperature within the range of from about 600° to about 900° C. in an oxidation atmosphere such as in the air. The nickel and cerium acetates are preferred, and the employment of these acetates makes it easy to provide the catalyst with a fine particle size and a large surface area.

The cerium oxide to nickel oxide ratio in the nickel oxide composition is a factor of importance to determine the catalytic activity of the catalyst of the present invention. The $CeO_2$ to $NiO$ molar ratio is from about 0.05 : 1 to about 2.5 : 1, preferably from about 0.07 : 1 to about 2.0 : 1 and more preferably from about 0.1 : 1 to about 1.5 : 1. However, it should be noted that the $CeO_2/NiO$ molar ratio suitable for this purpose should not be considered to be restricted to said particular limits. These ranges were determined with catalysts containing the nickel oxide/cerium oxide composition in varying $CeO_2/NiO$ molar ratios as described in FIG. 1. With these catalysts filled in a catalyst converter, a sample gas having the following compositions: NO, 0.5%; CO, 2%; and $N_2$, 97.5%, was passed through the converter at a space velocity of 20,000 c.c. of gas per c.c. of catalyst bed per hour while heating the converter to keep the reaction temperature at 500° C. The percent conversions of the nitrogen oxides used were measured and plotted, as in FIG. 1, on a semilogarithmic graph chart wherein the present conversions observed were expressed using the arithmetic scale and the $CeO_2/NiO$ molar ratios of the catalysts used were expressed using the semilogarithmic scale.

The catalyst comprising the nickel oxide and cerium oxide composition according to the present invention possesses a high catalytic activity and a strong resistance to catalyst poisons such as lead or sulfur compounds. The nickel oxide/cerium oxide catalyst of the present invention, even when used continuously at high temperatures, can exhibit a stable function as the reduction catalyst, while decreasing only slightly in catalytic activity over a period of time. In order to demonstrate these characteristics, the catalyst of the present invention was compared with conventional catalysts. The catalyst containing the nickel oxide/cerium oxide composition in the $Ce_2/NiO$ molar ratio of 0.5 : 1 was used as a representative of the present invention, and catalysts with palladium supported on a carrier and with a nickel oxide and barium oxide mixture supported on a carrier were used as the conventional catalysts. The tests were run by passing said sample gas at a space velocity of 20,000 c.c. of gas per c.c. of catalyst bed per hour through a catalyst converter which is filled with each of the catalysts to be tested under the previous conditions unless otherwise set forth. Run I was accomplished where the reduction reaction was carried out at a temperature of 300° C. Run II was conducted where the reaction temperature of 900° C. was continued for 100 hours and then reduced to 300° C. In Run III, said catalysts under test were further impregnated in a 0.2 mol percent lead nitrate aqueous solution and dried to give the catalysts each containing 3 grams, calculated as lead, per 1,000 cubic cm. of the carrier with the catalyst components. With these impregnated catalysts used therein, the tests were conducted by heating the converter to maintain the reaction temperature at 500° C. Run IV was carried out where the reduction of the nitrogen oxides was effected for 500 hours using a sample gas containing said composition and additionally 50 p.p.m. of sulfur dioxide. The percent conversion of the nitrogen oxides was then measured with the exhaust gases discharged after said tests had been conducted and the results are shown in Table 1.

Table 1

| Catalyst Component | Amount of Nitrogen Oxides, p.p.m. | | | |
|---|---|---|---|---|
| | Run I | Run II | Run III | Run IV |
| $NiO + CeO_2$ | 500 | 700 | 900 | 800 |
| Pd | 1,000 | 4,000 | 6,000 | 5,000 |
| $NiO + BaO$ | 3,500 | 5,000 | 4,500 | 4,000 |

As can be seen in Table 1 above, the palladium catalyst is readily subject to catalyst poisons, and the nickel oxide and barium oxide mixed catalyst leads to a decrease in the catalytic activity with the operation time at high temperatures, whereas the nickel oxide/cerium oxide catalyst of the present invention shows excellent properties including a resistance to catalyst poisons and durability of the catalytic activity.

Figure 2:
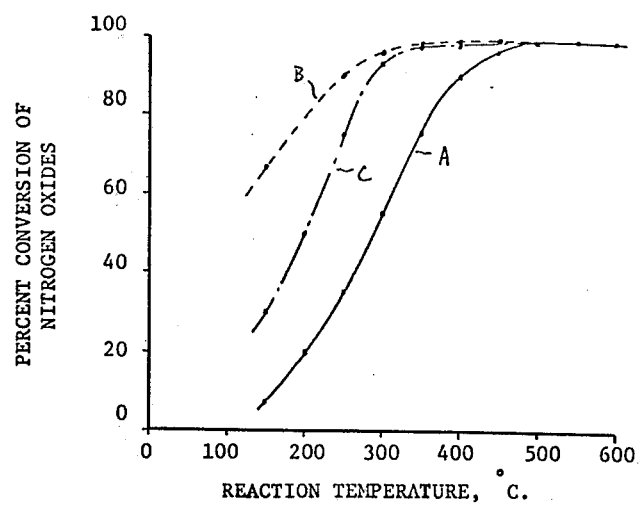

When used at relatively low temperatures, however, the catalyst of the present invention comprising the nickel oxide and cerium oxide composition does not provide a suficient conversion of the nitrogen oxides. This disadvantage which the catalyst of the present invention may entail when used at relatively low temperatures is alleviated by the employment of a small amount of rhodium as an additional catalyst component used together with the nickel oxide and cerium oxide composition. FIG. 2 shows the relation of the percent conversion of the oxides of nitrogen to the reaction temperature varying from about 150° C. to about 600° C. In FIG. 2, the solid line A shows the results given by a catalyst of the present invention containing nickel oxide and cerium oxide in the $CeO_2$ to NiO molar ratio of 0.5 : 1, which is prepared in accordance with Example 1 below and is referred to as Catalyst A; the line B denotes the percent conversion of the nitrogen oxides obtained with the nickel/cerium oxide catalyst containing rhodium in the amount of about 15 parts by weight with respect to 100 parts by weight of the nickel oxide and cerium oxide composition, this catalyst being prepared according to Example 2 as described hereinbelow and called Catalyst B; and line C indicates the percent conversion of the nitrogen oxides obtainable with a conventional rhodium catalyst which contains rhodium in an amount of about six times the amount of Catalyst B, this catalyst being referred to as Catalyst C. As can be seen in FIG. 2, the catalyst comprising the nickel oxide and cerium oxide composition with rhodium adhered thereto according to the present invention has a higher percent conversion of the nitrogen oxides than a conventional platinum-group catalyst which is deemed to be relatively active at relatively low temperatures and shows an excellent catalytic activity even with the use of a much smaller amount of rhodium than the conventional rhodium catalyst which contains the rhodium as the sole catalyst component.

Figure 3:
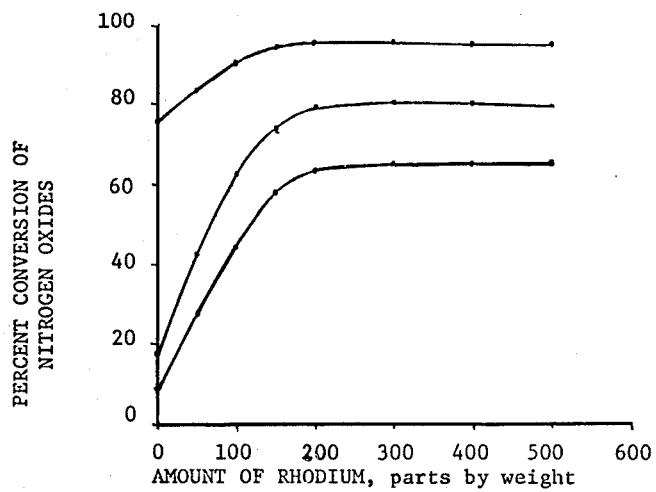

The amount of the rhodium to be adhered to the nickel oxide and cerium oxide composition is a factor of significance to determine the catalytic activity when employed at relatively low temperatures. FIG. 3 shows the relation of the percent conversion of the nitrogen oxides to the reaction temperatures varying from 100° C. to 300° C. From FIG. 3, the rhodium is employed in an amount of from about 7.5 to about 25 parts, preferably from about 10 to about 20 parts, by weight per 100 parts by weight of the nickel oxide and cerium oxide composition.

Where the mixed gases contain hydrogen gas or mosiure, the reduction of the nitrogen oxides, when mixed with a reducing agent such as carbon monoxide or hydrocarbons, also results in the formation of ammonia gas. The formation of this ammonia gas is considered to occur from the reduction of the nitrogen oxides with hydrogen gas formed by the reaction of hydrogen gas or carbon monoxide present in the mixed gases with water. The reduction reaction of the nitrogen of the nitrogen oxides is as follows:

$$H_2 + NO_x \rightarrow NH_3 + H_2O \qquad 4$$

The ammonia gas thus formed may be readily oxidized in an oxidation atmosphere and converted again to the nitrogen oxides. This means that this re-conversion to the nitrogen oxides does not contribute to a substantial decrease in the nitrogen oxides in the exhaust gases. Accordingly, it is practically sufficient to have the reaction scheme as represented by reaction (2) selected rather than reaction (4) above.

Figure 4:
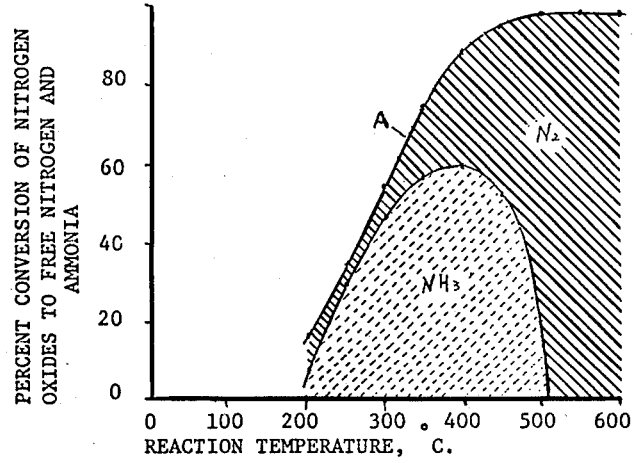
Figure 5:
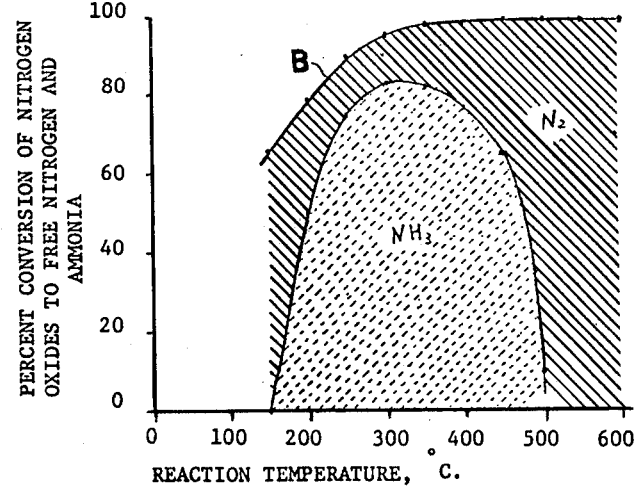

FIGS. 4 and 5 show both the relation of the percent conversion of the nitrogen oxides to free nitrogen ($N_2$) and to ammonia ($NH_3$) at varying reaction temperatures. In FIG. 4 where Catalyst A was used and in FIG. 5 where Catalyst B was used, the areas marked with the solid, oblique lines show the conversion of the nitrogen oxides to free nitrogen and the areas marked with the dashed, oblique lines show the conversion of the nitrogen oxides to ammonia. These tests were conducted by passing mixed gases comprising the following composition: NO, 750 p.p.m.; HC, 375 p.p.m.; CO, 1.25%; $CO_2$, 9%; $O_2$, 0.3%; $H_2O$, 3%; $H_2$, 1%; and $N_2$, 85%, over each of the catalysts under test at the space velocity of 20,000 c.c. of gas per c.c. of catalyst bed per hour, and the exhaust gases emerged after being passed over the catalysts were measured with respect to the percent conversion of the nitrogen oxides to free nitrogen and ammonia.

As can be seen from FIGS. 4 and 5, the nitrogen oxides remain unreacted and are not converted to free nitrogen or ammonia or they are converted predominantly to ammonia when the reduction is effected at a temperature lower than 500° C., whereas the formation of ammonia gas is hardly seen and the conversion of the nitrogen oxides to free nitrogen is effectively accomplished at reaction temperatures of higher than about 500° C. Accordingly, where the catalytic reduction is effected with a reduction catalyst comprising the nickel oxide and cerium oxide composition or comprising said composition and rhodium over which a mixed gas containing the nitrogen oxides and a reducing agent such as carbon monoxide, hydrogen gas, a hydrocargon and the like is passed at a temperature of higher than about 500° C., the percent conversion of the nitrogen oxides to free nitrogen is maintained at a high level, thus preventing the formation of ammonia gas to a great extent. It is considered that this phenomenon would be attributable to the selection of a reaction represented by reaction scheme (2) rather than (4).

In order to control the formation of ammonia gas when the nickel oxide/cerium oxide system catalyst or the nickel oxide/cerium oxide/rhodium system catalyst is used in the catalyst converter of an internal combustion engine for example, it is necessary to maintain the gas temperature at higher than 500° C. at which the catalyst is brought into contact with the exhaust gases. However, since the temperature of the exhaust gases at the time of starting is relatively low, it is necessary to provide in the engine or the like a means for heating the exhaust gases to elevate the temperature thereof to higher than 500° C. This would make the mechanism of the engine complicated. Furthermore, if the catalyst converter were equipped said means at a position closer to the exhaust port of the engine, the conversion of the nitrogen oxides would be effected before the temperature of the exhaust gases is reduced, whereby ammonia gas is prevented from being formed at the time of starting. However, the reaction temperature may rise to around 1,000° C. while the converter is operated continuously for a long time, so that the durability of the catalyst against heat may present a problem. Accordingly, if a catalyst capable of effectively converting the nitrogen oxides to free nitrogen while preventing the formation of ammonia gas even when used at relatively low temperatures were found, it would be unnecessary to provide the engine or the like equipped with an apparatus for preheating the exhaust gases. Such a catalyst can also serve to prevent the deterioration of the catalyst caused by the heat of the exhaust gases.

Figure 6:
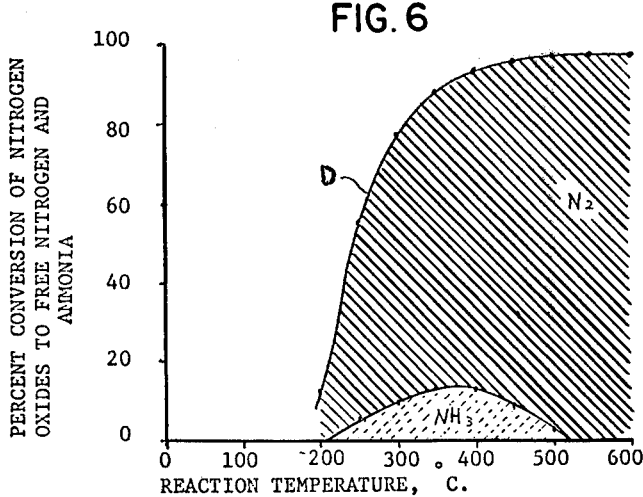
Figure 7:
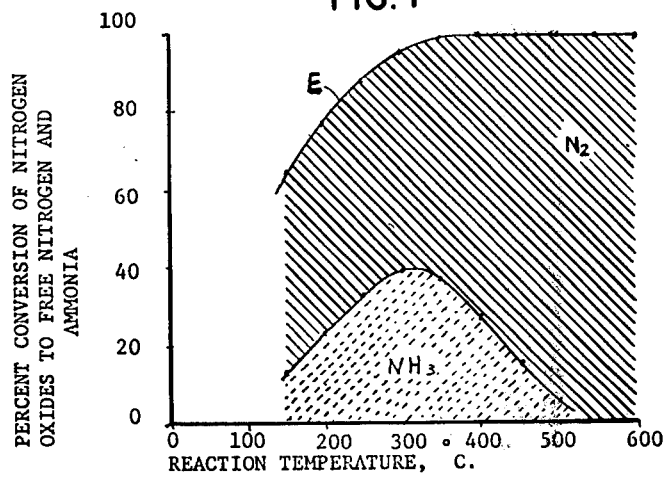
Figure 8:
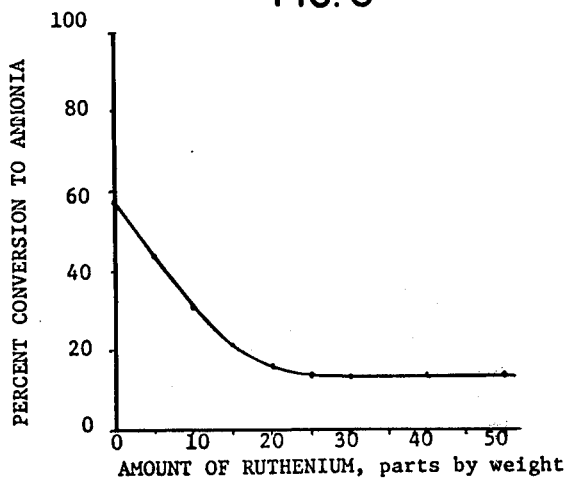
Figure 9:
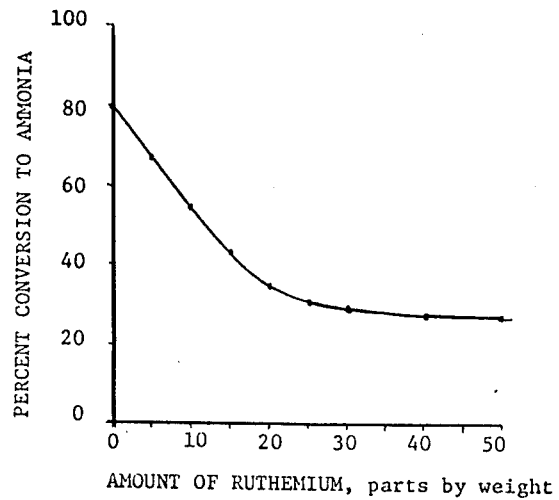
Figure 10:
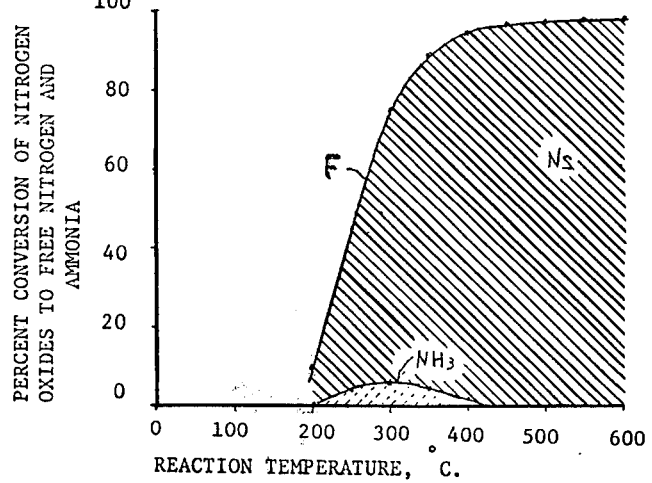
Figure 11:
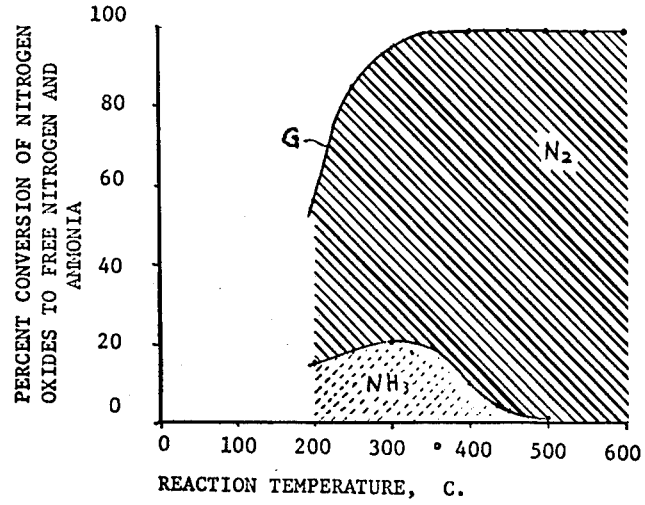
Figure 12:
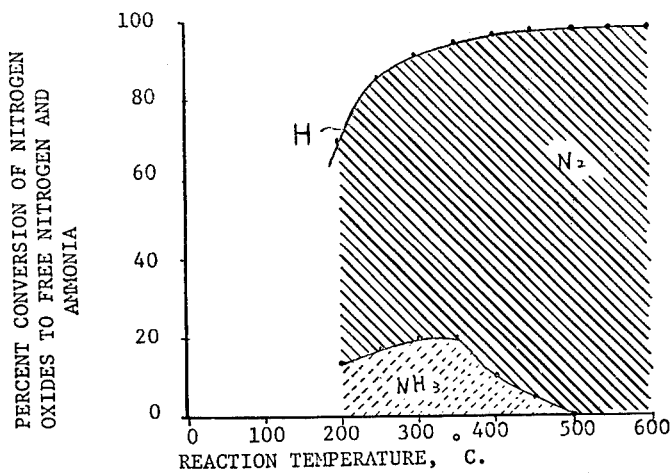
Figure 13:
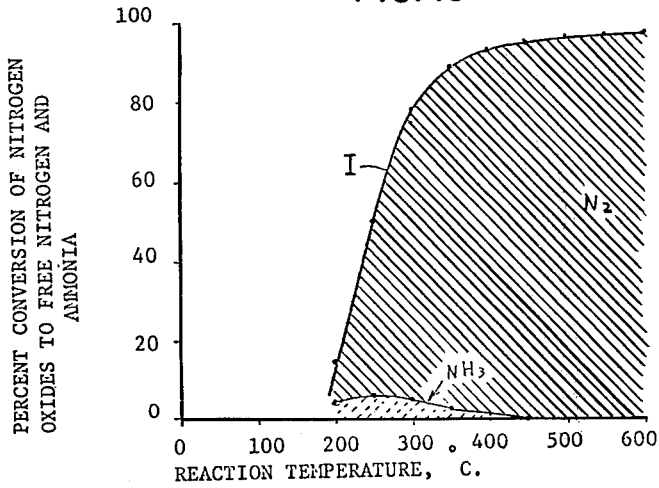
Figure 14:
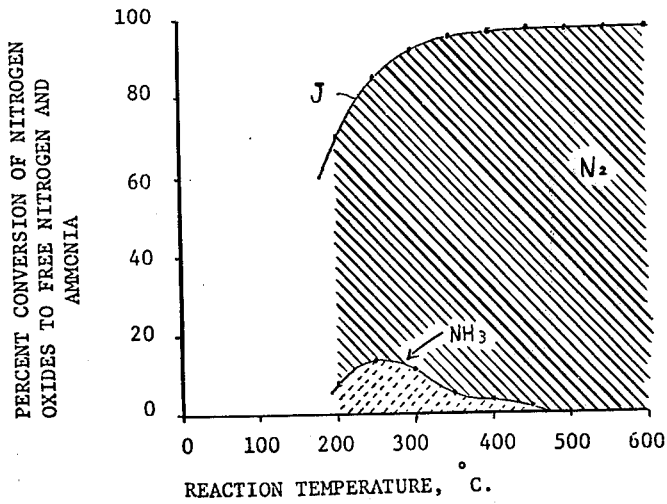
Figure 15:
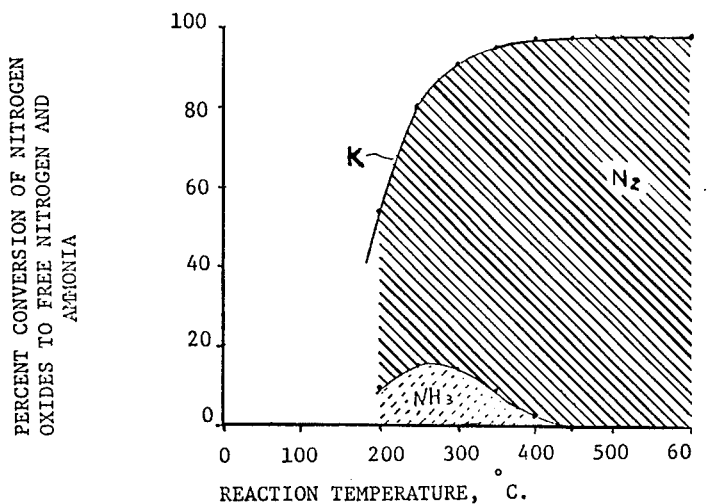
Figure 16:
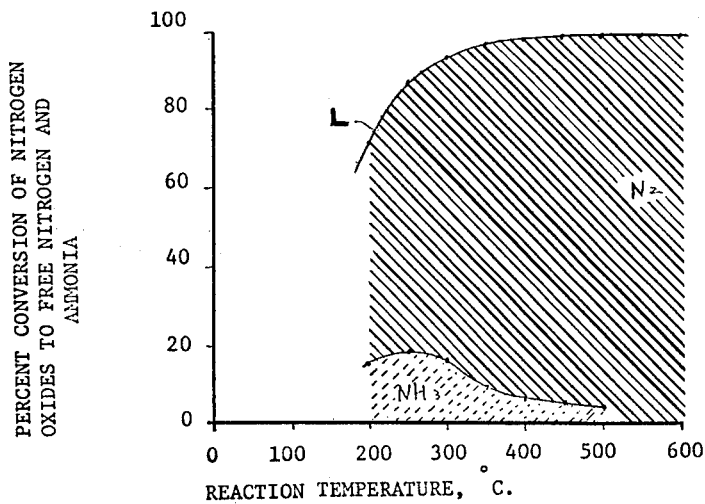

The solution of this problem which the present invention has found is the addition of ruthenium to the nickel oxide and cerium oxide composition or to said composition containing rhodium. Where the addition of ruthenium to the nickel oxide/cerium oxide composition is made, the amount of ruthenium is from about 10 to about 50 parts, preferably from about 20 to about 30 parts, by weight with respect to 100 parts by weight of the nickel oxide and cerium oxide composition. Where ruthenium is added to the nickel oxide/cerium oxide/rhodium system catalyst, the amount of ruthenium is from about 15 to about 50 parts, preferably from about 20 to about 30 parts, by weight per 100 parts by weight of the nickel/cerium oxides composition. FIGS. 6 and 7 show both the relation of the percent conversion of the nitrogen oxides to free nitrogen and to ammonia gas at varying reaction temperatures by passing the mixed gases having the same composition as that of the mixed gases as referred to in the description of FIGS. 4 and 5 above at a space velocity of 20,000; in FIG. 6, the nickel oxide/cerium oxide/ruthenium system catalyst was used and in FIG. 7 the nickel oxide/cerium oxide/rhodium/ruthenium system catalyst was used. FIGS. 8 and 9 show the relationship of the conversion of the nitrogen oxides to free nitrogen with the conversion thereof to ammonia gas at varying amounts of ruthenium at a reaction temperature of 400° C., in which ruthenium was added to the nickel oxide/cerium oxide composition and to the nickel oxide/cerium oxide/rhodium catalyst components, respectively.

The formation of ammonia gas is prevented more effectively by adding to the nickel oxide/cerium oxide/ruthenium system catalyst or to the nickel oxide/cerium oxide/rhodium/ruthenium system catalyst one or more metallic sulfides such as, for example, cupper sulfide, potassium sulfide, silver sulfide, zinc sulfide, cadmium sulfide, cobalt sulfide and cerium sulfide, cupper sulfide, potassium sulfide and silver sulfide being preferred, or by treating said catalyst by means of heating in a stream of sulfur compounds such as hydrogen sulfide or carbon disulfide for about 30 minutes at about 400° to about 500° C. or by adhering to said catalyst fine sulfur powders and heating such a catalyst in a mixed stream of hydrogen and an inert gas for from about 30 minutes to about 2 hours at about 400° C. to about 500° C. The amount of the metal sulfide which is added to the catalyst components of the present invention may vary depending upon the gas composition, reaction temperature and space velocity of the gas to be reacted, but it may be to the extent of from about 0.1 to about 2 moles per mole of ruthenium. FIGS. 10 to 16 each show the relationship of the conversion of the nitrogen oxides to free nitrogen with the conversion thereof to ammonia gas at varying reaction temperatures, wherein the mixed gases as referred to under FIGS. 4 and 5 were passed at the space velocity of 20,000, and Catalyst F was used in FIG. 10; Catalyst G in FIG. 11; Catalyst H in FIG. 12; Catalyst I in FIG. 13; Catalyst J in FIG. 14; Catalyst K in FIG. 15; and Catalyst L in FIG. 16; Catalysts F to L being described and referred to in the following examples.

The ruthenium present in the catalyst components of the present invention may be oxidized to ruthenium dioxide or $RuO_2$ and further to ruthenium tetraoxide or $RuO_4$ at the time when the composition of the exhaust gases turns the catalyst converter into an oxidation atmosphere in the course of operation of internal combustion engines or the like. In particular, the ruthenium tetraoxide is highly toxic to human beings when discharged into the atmosphere, and the volatilization of ruthenium as ruthenium tetraoxide also causes a decrease in the amount of ruthenium and at the same time impairs the efficacy of the catalyst, so that it is desired to prevent the oxides of ruthenium from being formed. For this purpose, the addition of a material which can form a compound oxide with ruthenium is made. Such a material is preferably an oxide of a metal having the radius of an ion of greater than about 1.05 angstroms, such as, for example, calcium, strontium, barium, lanthanum, neodymium, samarium and gadolinium. The oxides of other metals such as, for example, magnesium, aluminum, titanium, zirconium, manganese, iron, nickel, cerium and ytterbium may also be employed. These metal oxides may form a solid solution with ruthenium at high temperatures and fix it in the form of a compound oxide. Thus the employment of such metal oxides prevents ruthenium from being oxidized and volatilized as ruthenium tetraoxide, serving to retain it in the reaction system. After the oxidation atmosphere is returned again to the reduction atmosphere, the ruthenium can again serve as the catalyst component with excellent catalytic activity. The metal oxide may be added in an amount of from about 0.5 mole to about 2 moles per mole of ruthenium. Table 2 shows the percent retention of ruthenium determined with catalysts wherein the metal oxides were added to ruthenium dioxide in the metal atom to ruthenium atom molar ratio of 1 : 1 and calcined for 2 hours at 1,100° C. in the air. The percent retention of ruthenium was determined by qualitative analysis and the composition of the calcined products was determined by the X-ray diffractiometry. The results are shown in Table 2:

Table 2

| Metal oxide | Radius of Ion, A | Percent Retention | Main Calcined Products |
|---|---|---|---|
| Magnesium oxide | 0.75 | 25 | $MgO,RuO_2$ |
| Calcium oxide | 1.05 | 70 | $CaRuO_4,CaO,RuO_2$ |
| Strontium oxide | 1.18 | 98 | $Sr_2RuO_4,SrRuO_3$ |
| Barium oxide | 1.38 | 92 | $Ba_2RuO_4$ |
| Aluminum oxide | 0.55 | 25 | $Al_2O_3,RuO_2$ |
| Titanium oxide | 0.60 | 25 | $TiO_2,RuO_2$ |
| Zirconium oxide | 0.80 | 25 | $ZrO_2,RuO_2$ |
| Manganese oxide | 0.70 | 30 | $Mn_2O_3, RuO_2$ |
| Iron oxide | 0.80 | 30 | $Fe_2O_3,RuO_2$ |
| Nickel oxide | 0.74 | 30 | $NiO,RuO_2$ |
| Lanthanum oxide | 1.22 | 99 | $La_2Ru_2O_7$ |
| Cerium oxide | 0.94 | 30 | $CeO_2,RuO_2$ |
| Neodymium oxide | 1.15 | 95 | $Nd_2Ru_2O_7$ |
| Samarium oxide | 1.13 | 95 | $Sm_2Ru_2O_7$ |
| Gadolium oxide | 1.11 | 94 | $Cd_2RuO_7$ |
| Ytterbium oxide | 1.00 | 70 | $Yb_2O_3,RuO_2$ |

It is to be noted that the addition of said metal oxides to the catalyst components of the present invention does not impair the catalytic activity thereof. Table 3 shows the relationship of the percent conversion of the nitrogen oxides at the initial stage with that at the time after heating wherein various metal oxides were each added to the nickel oxide/cerium oxide/rhodium/ruthenium system catalyst in the amount of about 2 moles per mole of the ruthenium in the catalyst and the sample gas having the same composition as that of the gases as referred to in the description of FIGS. 4 and 5 was passed at the space velocity of 20,000 for 2 hours at 1,100° C. As controls, the said system catalyst without the addition thereto of the metal oxides was used. The results are shown in Table 3.

Table 3

| Metal Oxide | Percent Conversion of Nitrogen Oxides | |
|---|---|---|
| | At the Initial Stage | After Heating |
| SrO | 99 | 95.5 |
| Control | 99.9 | 80 |
| CaO | 99 | 95 |
| Control | 99.9 | 85 |
| BaO | 99 | 96.5 |
| Control | 99.9 | 83 |
| $La_2O_3$ | 99.9 | 96 |
| Control | 99.9 | 85 |
| $Nd_2O_3$ | 99.9 | 95 |
| Control | 99.9 | 85 |
| $Sm_2O_3$ | 99.9 | 98.2 |
| Control | 99.9 | 85 |
| $Gd_2O_3$ | 99.9 | 93.3 |
| Control | 99.9 | 85 |

The following examples illustrate the present invention without limiting the same thereto.

EXAMPLE 1

Alumina granules having a diameter of about 4 mm., a porosity of about 40 percent by volume, a bulk density of about 0.8 and a specific surface area of about 160 square meters per gram measured by the BET method were placed in boiling pure water for 30 minutes and washed six times with water to remove impurities adhered thereto.

This pre-treated carrier was impregnated in a solution of 249 parts by weight of nickel acetate tetrahydrate, $Ni(CH_3COO)_2.4H_2O$, and 157 parts by weight of cerium acetate monohydrate, $Ce(CH_3COO)_2.H_2O$, in 3,000 parts by weight of water by means of the reduced pressure impregnation method. This impregnated carrier was then placed in an electric furnace and calcined for one hour at 900° C. The calcined carrier was again impregnated in said aqueous solution and thereafter calcined. This procedure was repeated six times to yield a catalyst having a nickel oxide and cerium oxide composition in an amount of about 3 grams per 1,000 cubic centimeters of the carrier. The cerium oxide to nickel oxide ratio of the catalyst is 0.5 : 1 ($CeO_2$ : NiO). This catalyst is called Catalyst A simply for brevity of explanation.

EXAMPLE 2

The nickel oxide and cerium oxide composition obtained in Example 1 was impregnated in an aqueous solution containing 0.3 percent by weight of rhodium chloride and then calcined for 10 minutes at 600° C. in a nitrogen atmosphere containing 1 percent by volume of hydrogen gas. This procedure was repeated five times to give a catalyst containing rhodium in the amount of about 15 parts by weight per 100 parts by weight of the nickel oxide and cerium oxide composition. This catalyst is called Catalyst B.

EXAMPLE 3

The nickel oxide and cerium oxide composition obtained in Example 1 was impregnated in an aqueous solution containing 0.5 percent by weight of ruthenium chloride and then reduced in hydrogen gas for 30 minutes at 600° C. This procedure was repeated six times to give a catalyst containing ruthenium in the amount of about 30 parts by weight per 100 parts by weight of the $NiO/CeO_2$ composition. This catalyst is called Catalyst D.

EXAMPLE 4

The nickel oxide/cerium oxide composition obtained in Example 1 was impregnated in an aqueous solution containing 0.5 percent by weight of rhodium chloride and 0.8 percent by weight of ruthenium chloride and then reduced in a nitrogen atmosphere containing 1 percent by volume of carbon monoxide for 30 minutes at 600° C. This procedure was repeated four times to give a catalyst containing rhodium and ruthenium in the amounts of about 20 parts and about 30 parts, by weight, respectively, per 100 parts by weight of the nickel oxide/cerium oxide composition. This catalyst is referred to as Catalyst E.

EXAMPLE 5

The nickel oxide/cerium oxide/ruthenium ternary catalyst obtained in Example 3 was treated by heating it in a stream of the mixed gases comprising 3 percent by volume of hydrogen sulfide and 97 percent by volume nitrogen for 1 hour at 420° C. This catalyst is referred to as Catalyst F.

EXAMPLE 6

The nickel oxide/cerium oxide/rhodium/ruthenium system catalyst obtained in Example 4 was treated by heating it in a stream of the mixed gases of 5 percent by volume of carbon dioxide and 95 parts by volume of nitrogen for 1 hour at 400° C. This catalyst is called Catalyst G.

EXAMPLE 7

The catalyst obtained in Example 4 was impregnated into a suspension of 1 gram of sulfur, ground into finely divided powders by mechanical means, in 1 liter of water and treated by heating it in a stream of the mixed gases of 4 percent by volume of hydrogen and 96 percent by volume of nitrogen for 1 hour 20 minutes at 400° C. This reduction catalyst is called Catalyst H.

EXAMPLE 8

The catalyst obtained in Example 3 was impregnated into an aqueous solution of 3 percent by weight of copper sulfide and reduced in a hydrogen atmosphere for 1 hour at 600° C. This procedure was repeated three times to give a catalyst containing copper sulfide in the amount equivalent to ruthenium. This catalyst is called Catalyst I.

EXAMPLE 9

The catalyst obtained in Example 4 was treated in the same manner as in Example 8 to adhere copper sulfide thereto. This catalyst is referred to as Catalyst J.

EXAMPLE 10

The catalyst obtained in Example 4 was impregnated in an aqueous solution of 5 percent by weight of potassium sulfate and reduced in the same manner as in Example 8 so as to adhere potassium sulfide thereto. This catalyst is referred to as Catalyst K.

EXAMPLE 11

The catalyst obtained in Example 4 was impregnated in an aqueous solution of 1 percent by weight of silver sulfate and reduced in the same manner as in Example 8 to give a catalyst with silver sulfide adhered thereto. This catalyst is called Catalyst L.

EXAMPLE 12

The catalyst obtained in Example 1 was impregnated in a solution of 3 percent by weight of strontium nitrate and heated for 1 hour at 800° C. in the air. This procedure was repeated three times. Then, the catalyst was impregnated in an aqueous solution of 0.5 percent by weight of rhodium chloride and 1 percent by weight of ruthenium chloride and reduced in a nitrogen atmosphere containing 1 percent by volume of carbon monoxide for 30 minutes at 600° C. This procedure was repeated six times to give a catalyst containing about 20 parts by weight of rhodium and about 40 parts by weight of ruthenium per 100 parts by weight of the nickel oxide/cerium oxide composition. In the procedure wherein the mixed solution of rhodium an ruthenium chlorides was used, strontium oxide is hardly reduced and remains in the form of the oxide. The amount of strontium oxide was about 2 moles with respect to 1 mole of ruthenium of the catalyst.

The symbols A to L, inclusive, appearing in the accompanying drawings correspond to the corresponding symbols which are used, for brevity of explanation, to denote each catalyst described and prepared by Examples 1 to 11 and which are recited after the term "Catalyst" therein.

What we claim is:

1. A catalyst for reducing the oxides of nitrogen consisting essentially of a composition of nickel oxide, cerium oxide and rhodium, the molar ratio of the $CeO_2$ to the NiO being within the range of from about 0.05 to 1 to about 2.5 to 1 and the amount of the Rh being from about 7.5 to about 25 parts by weight to 100 parts by weight of the $CeO_2$ and the NiO.

2. The catalyst according to claim 1, wherein the amount of Rh is from about 10 to about 20 parts by weight to 100 parts by weight of the $CeO_2$ and the NiO.

3. The catalyst according to claim 1, wherein the composition includes ruthenium in an amount of from about 15 to 50 parys by weight to 100 parts by weight of the $CeO_2$ and the NiO.

4. The catalyst according to claim 3, wherein the amount of the Ru is from about 20 to about 30 parts by weight to 100 parts by weight of the $CeO_2$ and the NiO.

5. The catalyst according to claim 3, wherein the composition further includes one or more metal sulfides selected from the group consisting of copper sulfide, calcium sulfide, silver sulfide, zinc sulfide, cadmium sulfide, cobalt sulfide and cerium sulfide in an amount of from about 0.1 to about 2 moles per mole of the Ru.

6. The catalyst according to claim 3, wherein the composition further includes one or more metal oxides selected from the group consisting of magnesium oxides, calcium oxide, strontium oxide, barium oxide, aluminum oxide, titanium oxide, zirconium oxide, manganese oxide, iron oxide, nickel oxide, lanthanum oxide, cerium oxide, neodymium oxide, samarium oxide, gadolinium oxide and ytterbium oxide in an amount of from about 0.5 to about 2 moles per mole of the Ru.

7. The catalyst according to claim 1, wherein the molar ratio of the $CeO_2$ to the NiO is from about 0.07 to 1 to about 2.0 to 1.

8. The catalyst according to claim 1, wherein the molar ratio of the $CeO_2$ to the NiO is from about 0.1 to 1 to about 1.5 to 1.

9. The catalyst according to claim 3, wherein the nickel oxide/cerium oxide/rhodium/ruthenium catalyst is heated in a stream containing a sulfur compound or wherein said catalyst to which finely divided sulfur powders are adhered is heated in a stream containing hydrogen and an inert gas.

* * * * *